No. 732,637. PATENTED JUNE 30, 1903.
J. W. P. INSLEY.
APPARATUS FOR CLEANSING CRAB SHELLS.
APPLICATION FILED FEB. 7, 1903.
NO MODEL
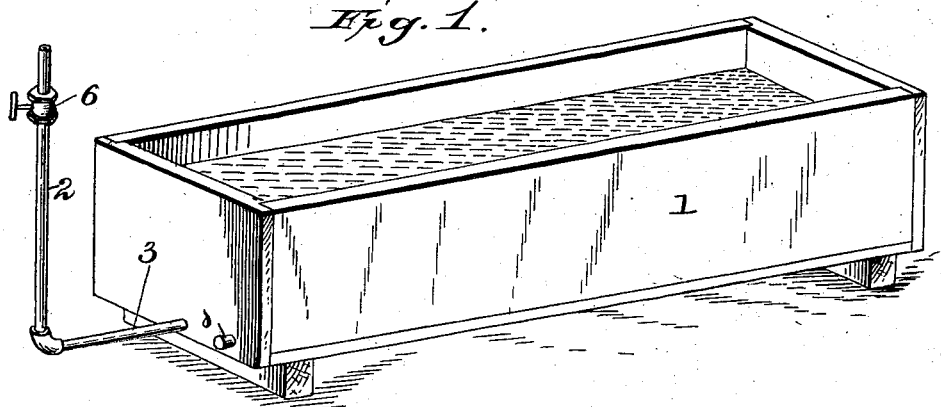
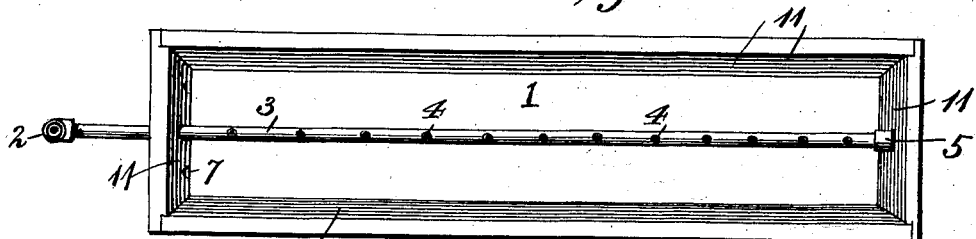
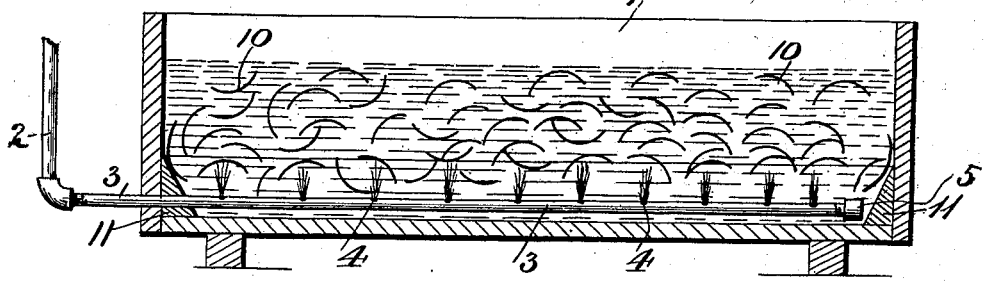
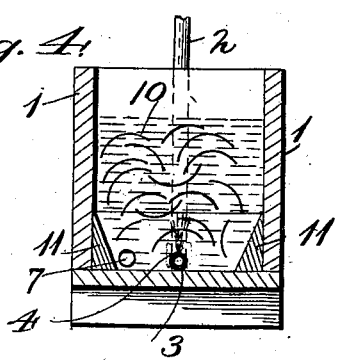
Witnesses
F. L. Ourand
Ida Ford
Inventor
John W. P. Insley.
by C. J. Stockman
Attorney No. 732,637. Patented June 30, 1903.

UNITED STATES PATENT OFFICE.

JOHN W. P. INSLEY, OF BIVALVE, MARYLAND.

APPARATUS FOR CLEANSING CRAB-SHELLS.

SPECIFICATION forming part of Letters Patent No. 732,637, dated June 30, 1903.

Application filed February 7, 1903. Serial No. 142,374. (No model.)

*To all whom it may concern:*

Be it known that I, JOHN W. P. INSLEY, a citizen of the United States, residing at Bivalve, in the county of Wicomico and State of Maryland, have invented certain new and useful Improvements in Apparatus for Cleansing Crab-Shells; and I do hereby declare the following to be a full, clear, and exact description of the invention, such as will enable others skilled in the art to which it appertains to make and use the same.

This invention has for its object the provision of a simple and inexpensive apparatus which will act to free from crab-shells the skin and particles of meat and oil which adhere thereto when the crabs are removed therefrom and leave the shells in the clean and polished condition required therefor when they are to be sold with deviled crabs, for example, and which apparatus in the accomplishment of its purpose will not only eliminate the necessity of the hand-labor now employed to cleanse and polish crab-shells, but will cleanse and polish the shells with a minimum of breakage thereof and dispense with the necessity of using expensive means or apparatus at present not found in establishments which have need for this class of apparatus.

To this end the invention consists, essentially, of a tank or receptacle adapted to contain a cleansing solution in which the shells are immersed *en masse*, and a discharge-pipe in said tank having communication solely with means for supplying steam thereto under pressure, whereby steam is employed as the sole means for not only maintaining the temperature of the cleansing solution to that requisite for the best results, but also to agitate the shells, and thereby cause them to rub against and polish each other and to assure that each shell shall be fully presented to the action of the cleansing means.

In the accompanying drawings, illustrating the invention, Figure 1 is a perspective view of an apparatus constructed in accordance with the invention. Fig. 2 is a plan view of the same. Fig. 3 is a longitudinal sectional view of the same, in which is indicated a series of crab-shells being cleansed; and Fig. 4 is a transverse section through the apparatus.

The same numerals of reference designate the same parts in the several views.

1 designates a tank of suitable construction, size, shape, and material to contain a cleansing liquid or solution, such as water and an alkali, and the mass of crab-shells to be cleansed.

2 designates a pipe, one end of which is connected with a suitable source of steam-supply, (not shown,) through which steam under pressure is supplied to the tank, said steam reaching the interior of the tank through a pipe 3, which extends longitudinally of the tank and is arranged near the bottom thereof. Said pipe 3 has its upper side provided with a series of discharge-apertures 4, and its end remote from its inlet end is closed by a suitable cap 5.

The steam-supply pipe 2 is provided with a suitable valve 6 for controlling the supply of steam to the discharge-pipe 3.

The tank 1 has an opening 7 at its bottom, through which the liquid and sediment may be withdrawn when it is desired to cleanse the tank and supply fresh liquid thereto, said opening being closed when the apparatus is in use by a plug 8 or other suitable closing device.

The operation of the apparatus is as follows: The tank is supplied with the water or cleansing solution and with the crab-shells 10, which shells are placed *en masse* therein. Steam under pressure is then supplied through the pipes named and is discharged into the cleansing liquid and against the lower layer of shells in contact with the discharge-pipe. The function of the steam is twofold—first, to maintain the temperature of the liquid during the entire cleansing and polishing operation to that requisite to make said liquid most efficient in the performance of its function of loosening from the shell the material to be cleansed therefrom, and, second, to keep the shells in constant movement in the cleansing liquid. Its latter function is a most important one in the rapid and efficient cleansing of the shells, for the reason that the movement of the shells causes them to rub against and thereby polish each other, as well as further facilitate the operation of loosening the material. Moreover, the impinging of the steam-jets upon the shells not only causes movement referred to of the shells, but also further loosens the material struck by it. It will thus be seen that the combined action of the cleansing liquid in which the shells are immersed and the steam-jets heating the liquid and impinging upon the shells with sufficient force to agitate the same and aid in loosening the material causes said shells to be most efficiently cleansed in a very short space of time, whereby an establishment provided with this apparatus is equipped to thoroughly clean a great number of shells of all matter adhering thereto. Moreover, the use of the steam-jets, both treating the liquid and causing movement of the shells therein, makes the device entirely automatic in its operation, enables it to be operated at minimum expense, reduces to a minimum liability of breakage of the shells, and avoids the necessity of employing supplemental means, hand-operated or otherwise, for causing movement of the shells in the cleansing liquid. Furthermore, steam is now employed for other purposes in establishments which require an apparatus for this purpose, and hence this apparatus for the cleansing and polishing of the crab-shells may be installed at minimum expense, it being itself of simple and inexpensive construction, having no special means for agitation purposes and requiring only connection with the source of steam-supply in order to be complete and ready for use.

The lower end of the tank 1 is reduced in size as compared with the upper end thereof, whereby the shells are more efficiently conducted to within the sphere of influence of the steam and are massed at the bottom of the tank in such close engagement with each other as to better assure movement throughout the mass of shells, and said lower end is preferably inclined toward the steam-pipe 3 in order that it may most efficiently accomplish its purpose. It is preferred to provide the inside of the tank with an open frame 11, set in the lower end thereof and composed of inclined boards, which may be secured to the sides and ends of the tank or removably set in the tank to produce said inclined and reduced lower end of the tank.

After the shells are removed from the cleansing-tank they are preferably rinsed, and for this purpose may be immersed in fresh water or other suitable liquid in a rinsing-tank.

The invention is not in all respects restricted to the construction hereinabove described, because other means for accomplishing the purpose may be employed without departing from the spirit thereof; but, as hereinabove stated, that described is greatly preferred to any other on account of its simplicity and inexpensiveness of construction, economy of operation, and its increased efficiency.

Having thus described the invention, what I believe to be new, and desire to secure by Letters Patent, is—

1. The apparatus herein described for cleansing and polishing crab-shells, comprising a tank for the cleansing liquid and the crab-shells to be cleansed and polished, and means for heating the liquid in said tank and for moving the mass of shells therein, for the purposes specified, said means consisting of a pipe located in the lower end of said tank and having discharge-apertures in its upper side, said pipe being connected solely with a steam-supply pipe, whereby the steam acts to heat the liquid and to cause said movement of the shells.

2. The apparatus herein described for cleansing and polishing crab-shells, consisting of a tank for an alkaline solution and the crab-shells to be cleansed and polished, said tank having a reduced lower end, a pipe extending longitudinally along the bottom of said tank and having outlets at intervals along its upper side through which steam is discharged against the shells in said liquid, said pipe having communication solely with a source of steam-supply, and a drainage-outlet at the lower end of said tank.

In testimony whereof I affix my signature in presence of two witnesses.

JOHN W. P. INSLEY.

Witnesses:
ANNIE S. HORSMAN,
WM. DENTON.